United States Patent [19]

Katayama et al.

[11] Patent Number: 5,133,128
[45] Date of Patent: Jul. 28, 1992

[54] DRIVE CONTROL SYSTEM FOR EXCHANGE ARM

[75] Inventors: Toshio Katayama; Noriaki Kinoshita, both of Fukui, Japan

[73] Assignee: Dai-ichi Seiki Co., Ltd., Fukui, Japan

[21] Appl. No.: 651,374

[22] PCT Filed: Sep. 14, 1990

[86] PCT No.: PCT/JP90/00302

§ 371 Date: Apr. 23, 1991

§ 102(e) Date: Apr. 23, 1991

[87] PCT Pub. No.: WO91/04131

PCT Pub. Date: Apr. 4, 1991

[30] Foreign Application Priority Data

Sep. 14, 1989 [JP] Japan .................. 1-236957

[51] Int. Cl.$^5$ .............................. B23Q 3/157
[52] U.S. Cl. .................... 483/44; 414/736; 483/37; 483/39
[58] Field of Search ........... 29/568; 414/736, 729; 294/104, 106

[56] References Cited

U.S. PATENT DOCUMENTS

| | | | |
|---|---|---|---|
| 3,256,600 | 6/1966 | Swanson et al. | 29/568 |
| 4,156,962 | 6/1979 | Haller | 29/568 |
| 4,221,043 | 9/1980 | Dailey | 29/568 |
| 4,344,220 | 8/1982 | Sachot | 29/568 |
| 4,669,174 | 6/1987 | Fischer | 29/568 |
| 4,713,875 | 12/1987 | Dormehl | 29/568 |
| 4,831,714 | 5/1989 | Babel et al. | 29/568 |
| 4,837,919 | 6/1989 | Hoppe | 29/568 |
| 4,860,429 | 8/1989 | Von Haas | 29/568 |

FOREIGN PATENT DOCUMENTS

| | | | |
|---|---|---|---|
| 59-93250 | 5/1984 | Japan | 29/568 |
| 61-795539 | 4/1986 | Japan | 29/568 |
| 62-8050 | 1/1987 | Japan | 29/568 |
| 62-27940 | 6/1987 | Japan | 29/568 |
| 1-109046 | 4/1989 | Japan | 29/568 |

*Primary Examiner*—William Briggs
*Attorney, Agent, or Firm*—Finnegan, Henderson, Farabow, Garrett and Dunner

[57] ABSTRACT

Herein disclosed is an exchange arm drive control system which is adopted as the automatic tool exchanger of a vertical quadruple spindle type machining center and enabled to contribute to sparing the space and improving the machinability. The drive control system is comprised mainly of means for clamping a tool and moving a tool holder in a Z-axis, means for rotating the tool holder by 180 degrees, means for turning exchange arms by 90 degrees and controlling the position of the tool holder; and means for moving the exchange arms on a Y-axis. Especially, in the 90-degree exchange arm turning and tool holder positioning means of those means, there is adopted a hollow shaft (16) for keeping a rotary shaft (2) away from associating with the 90-degree turn of the exchange arm (11) so that the tool can be conveyed with the tool holder being held in a constant position. As a result, the old and new tools can be exchanged by reciprocating the exchange arm (11) only once between the main spindles (S1 and S2) and a tool magazine (22).

1 Claim, 5 Drawing Sheets

DRIVE CONTROL SYSTEM FOR EXCHANGE ARM

TECHNOLOGICAL FIELD

The present invention relates to an exchange arm drive control system to be used in a machine tool such as a vertical quadruple spindle type machining center and, more particularly, to an exchange arm drive control system which is enabled to exchange old and new tools quickly by causing only one reciprocation of the exchange arm between the main spindle and the tool magazine.

BACKGROUND TECHNOLOGY

Of the machine tools, the machining center is a highly useful one because of its composite functions. Since, however, the single spindle type has a low machinability, the double spindle type has come into practical use since 1984, and the quadruple spindle type machining center has been developed and currently used in recent years.

As the number of spindles increases the more, the multi-spindle type machining center is required to have the more tool exchange devices and tool magazines so that it is complicated. As a result, this machining center is accompanied by defects that the tool exchange cannot be speeded up and that the machine structure is large-sized.

Of these, the vertical type machining center is required to perform its machining only in one direction. Thus, it is a remarkably important subject for the machining efficiency to shorten the time period required for the tool exchange.

In order to solve this problem, a machine tool equipped with a plurality of single spindle type automatic tool exchangers has been developed. In recent years, however, there has been developed a machine tool equipped with an automatic tool exchanger having two exchange arms which can be rotated on the axis of rotation and moved upward and downward, as disclosed in Japanese Patent Publication No. 62-27940.

Despite of these developments, however, the former has to be equipped with the automatic tool exchangers and the tool magazines according to the number of spindles so that it is defective in that the whole machine structure is complicated and large-sized. In the latter, on the other hand, the exchange arms have to make two reciprocations between the main spindle and the tool magazine so as to exchange the old and new tools so that the tool exchange time cannot be shortened, as expected. In order to solve the problem under consideration, moreover, the standby position of the exchange arms is located where their clamp pawls and the main spindle are concentric. Thus, there arises another serious defect that the exchange arms are directly influenced by the chip resulting from the machining.

Therefore, the present invention contemplates to provide a small-sized highly efficient automatic tool exchanger and accordingly a vertical multi-spindle type machining center, which gives an exchange arm the functions to clamp a tool and to move a tool holder in a Z-axis, to rotate the tool holder by 180 degrees, to turn the exchange arm by 90 degrees and position the tool holder, and to move the exchange arm on a Y-axis so that the old and new tools can be exchanged by reciprocating the exchange arm once between the main spindle and a tool magazine.

DISCLOSURE OF THE INVENTION

According to the present invention, a vertical quadruple spindle type machining center is provided with an exchange arm drive control system comprising: tool clamping and Z-axis tool holder moving means including a tool holder having totally four tool fingers capable of clamping individually two old and new tools, and a lift cylinder disposed below the tool holder for moving said tool holder upward and downward on a Z-axis on a spline shaft when the exchange arms turn to a main spindle and a tool magazine; 180-degree tool holder rotating means housed in the exchange arms and including two rotating pulleys and one drive belt for transmitting the drive force of a first actuator to said spline shaft to rotate the tool holder by 180 degrees when said exchange arms are turned to the main spindle; 90-degree exchange arm turning and tool holder positioning means including a hollow shalf, two turning pulleys and one turning shaft for turning the exchange arms by 90 degrees while holding and controlling the position of the tool holder, when it receives the drive force of a second actuator; and Y-axis exchange arm moving means including a slide cylinder disposed on an ATC base for sliding the slide base on a Y-Axis through the slide shaft to move the exchange arms placed and connected on the slide base forward and backward. Since these composite motions are continuously combined, the old and new tools can be replaced by reciprocating the exchange arms only once between the main spindle and the tool magazine so that a small-sized efficient machining center can be provided.

BEST MODE FOR CARRYING OUT THE INVENTION

The present invention will be described in more detail in the following with reference to the accompanying drawings.

Figure 1:
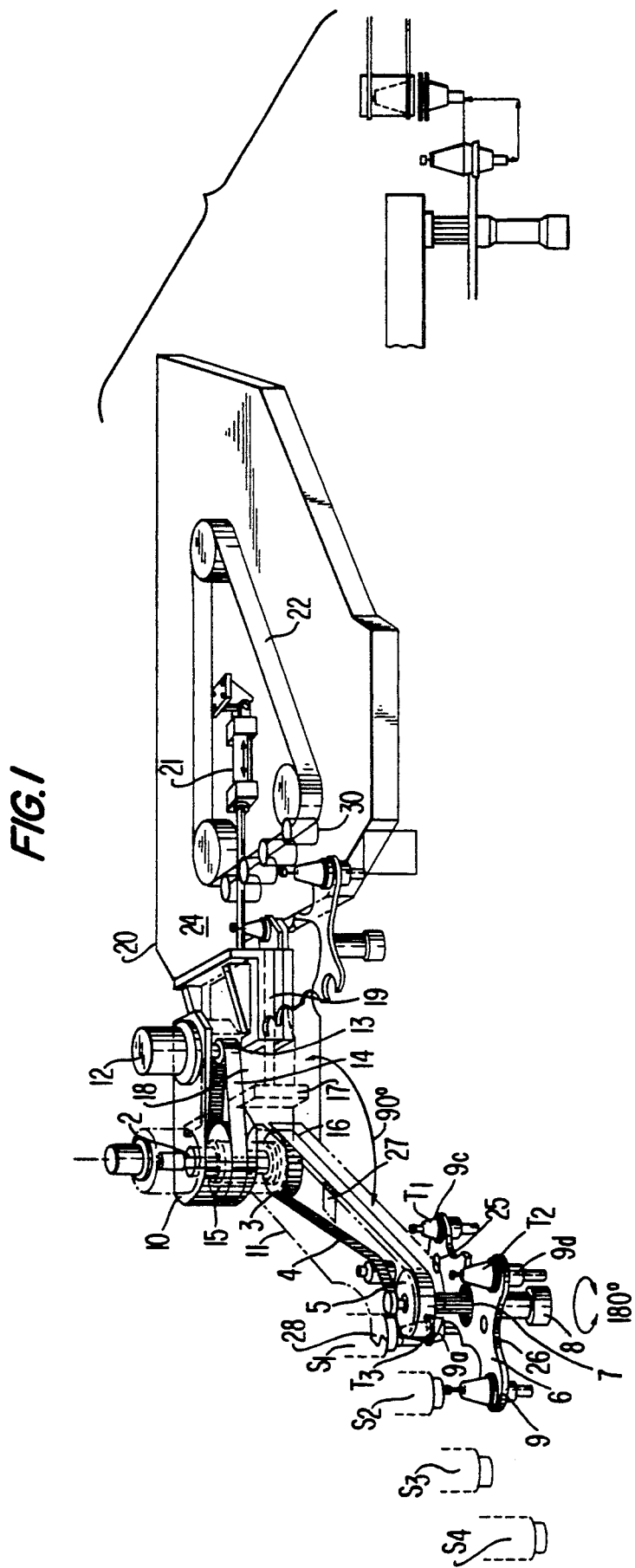
FIG. 1 is a perspective view showing the state of carrying out an exchange arm drive control system according to the present invention.
Figure 2:
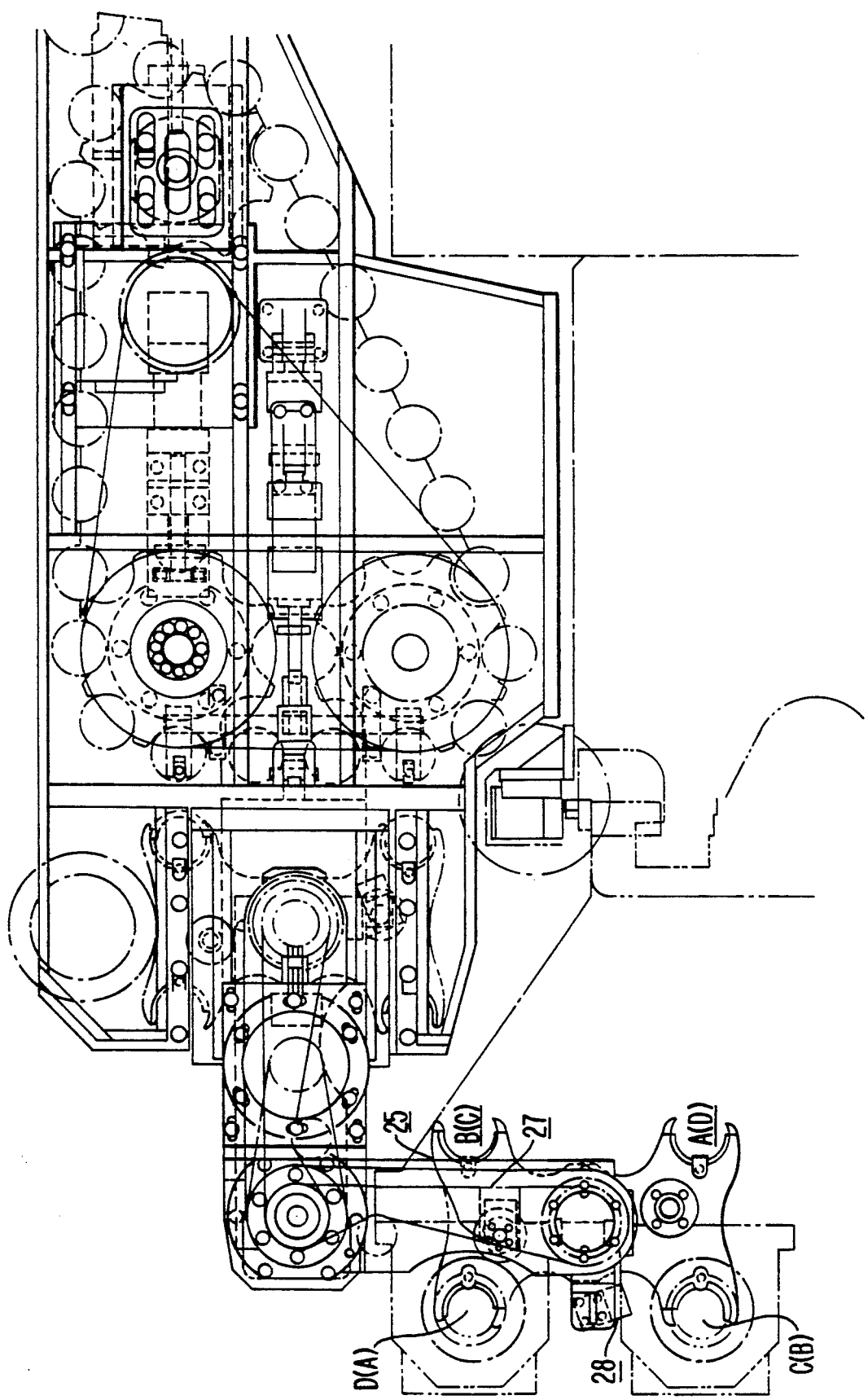
FIG. 2 is a top plan view showing the state of carrying out the present system.
Figure 3:
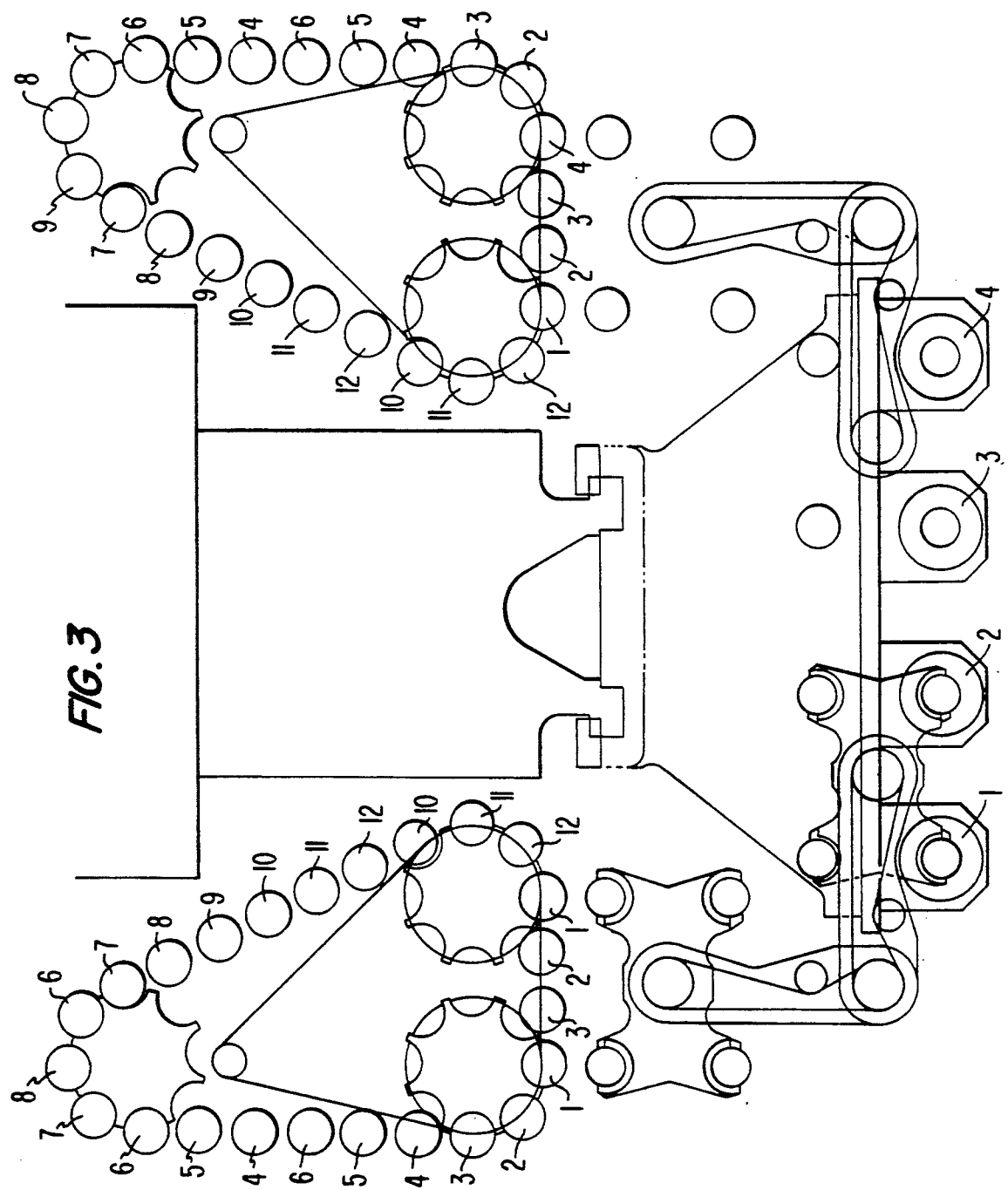
FIG. 3 is a schematic top plan view showing the positional relations of the individual portions when the present system is attached to a machine tool.
Figure 4:
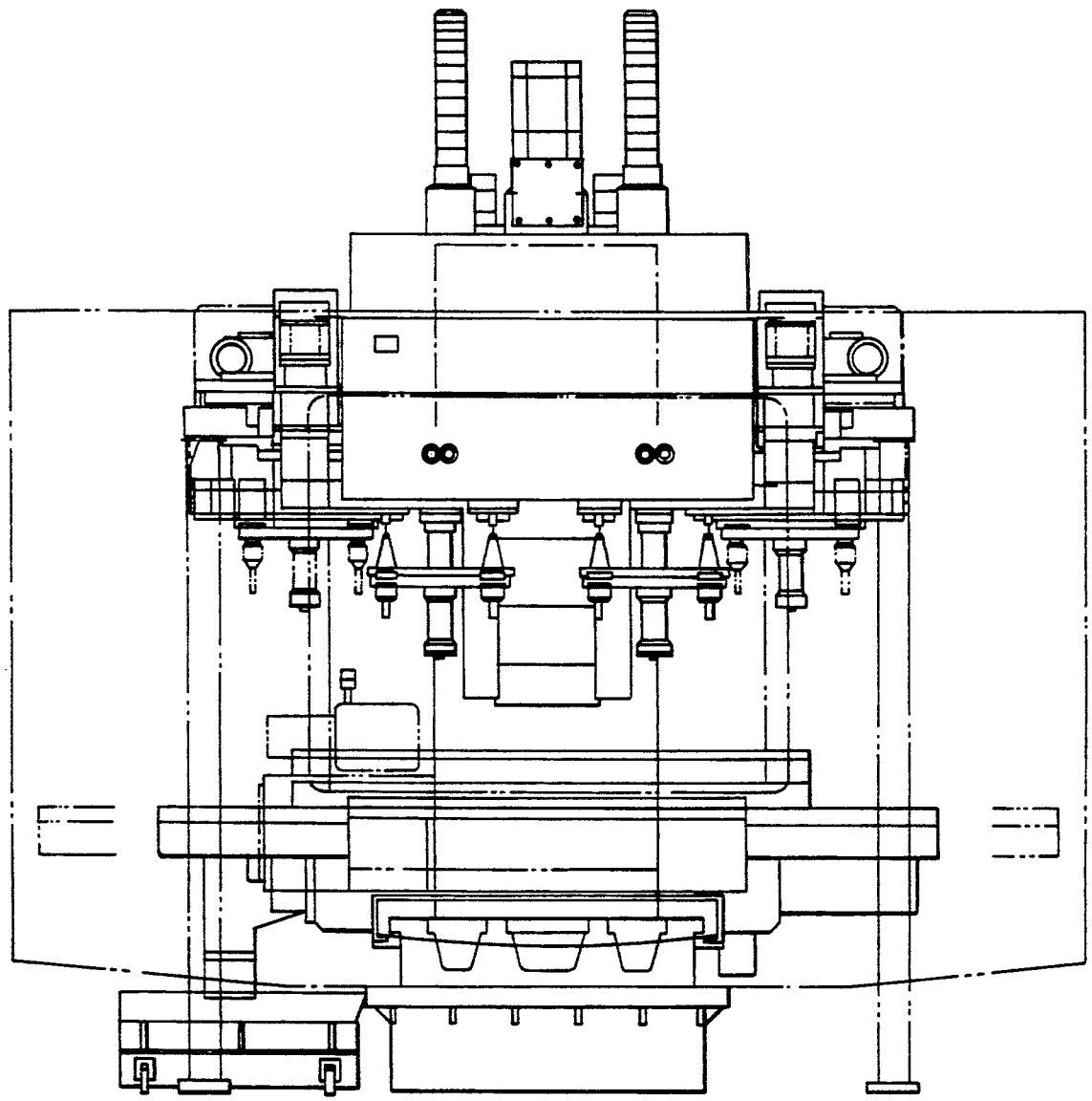
FIG. 4 is a front elevation showing a vertical quadruple spindle type machining center equipped with the present system.

First of all, the structure of the present invention will be described with reference to FIGS. 1 and 2. The tool clamping and Z-axis tool holder moving means includes: a tool holder 6 equipped with totally four tool fingers 9 for clamping individually two old and new tools; and a lift cylinder 8 disposed below the tool holder 6 for moving the tool holder 6 upward and downward in the Z-axis on a spline shaft when an exchange arm 11 is turned to the main spindle and the tool magazine. Moreover, the tool holder 6 is equipped with: a push pin 25 and a push pin 26 adapted to be pushed or not by dogs 27 and 28 formed in the exchange arm 11, thereby to unlock or lock tool fingers 9a and 9b, when said exchange arm is turned to the main spindle or the tool magazine.

Next, the 180-degree tool holder rotating means includes a first rotary pulley 3, a second rotary pulley 5 and a drive belt 4 housed in the exchange arm 11 for transmitting the drive force of a first actuator 1 to the aforementioned spline shaft 7 to rotate the tool holder 6 by 180 degrees. The aforementioned spline shaft 7 is connected to the rotary pulley 5 on the common axis of rotation, and the first rotary pulley 3 is connected through a rotary shaft 2 to the first actuator 1 on the common axis of rotation.

Next, the 90-degree exchange arm turning and tool holder positioning means includes a hollow shaft 16, a first rotary pulley 13, a second rotary pulley 15 and a drive belt 14 and is adapted to receive the drive force of a second actuator 12 for turning the exchange arm 11 by 90 degrees while holding the position of the tool holder 6. The hollow shaft 16 enclosing the rotary shaft 2 in a noninterferential sate is placed and fixed on the exchange arm 11, and the first rotary pulley 13 is connected through a rotary shaft 23 to the second actuator 12 on a common axis of rotation whereas the second rotary pulley 15 is connected to the hollow shaft 16 on a common axis of rotation.

Finally, the Y-axis exchange arm moving means includes a slide cylinder 21 disposed on an ATC base 20 for sliding a slide base 18 in its entirety on the Y-axis through a slide shaft 24 thereby to move the exchange arm 11 placed and connected on said slide base forward and backward. The slide shaft 24 is connected to the rear portion of the slide base 18.

Figure 5:
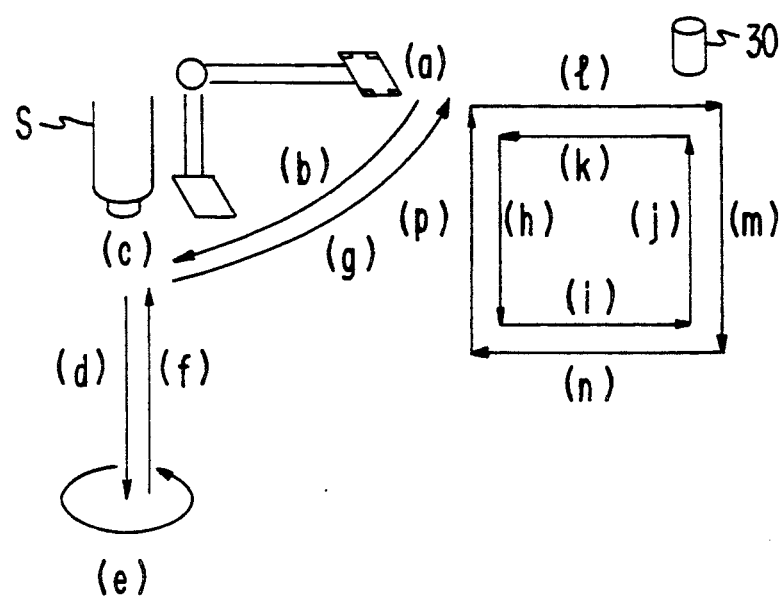
FIG. 5 is a schematic view showing the operating procedures of the exchange arm.

Next, the operating procedures of the exchange arm in case of the tool exchange using the present system will be described in the following with reference to FIGS. 1, 2 and 5.

First of all, the exchange arm 11 during the work machining is held standby, as indicated at (a), at the side of the tool magazine while being moved forward to the main spindle by the Y-axis motion of the slid cylinder 21 with the tool fingers 9c and 9d being inserted into the grooves of new tools T1 and T2 to be used for the machining. At this time, the tool holder 6 has been brought to its lifted position by the Z-axis motion of the lift cylinder 8, and the dog 28 is pushing the push pin 26 so that the tool fingers 9c and 9d clamp the new tools T1 and T2 in unlocked states.

When the machining is ended to issue a tool exchange signal, the second actuator 12 is started so that its rotation is transmitted through the rotary shaft 23, the first rotary pulley 13, the drive belt 14 and the second rotary pulley 15 to the hollow shaft 16 to turn the exchange arm 11 placing and fixing said hollow shaft 16 thereon by 90 degrees to the main spindle, as indicated at (b). At this time, neither the first actuator 1 nor the rotary shaft 2 is not associated with the turn of the exchange arm 11 because the hollow shaft 16 enclosing the rotary shaft 2 in the noninterferential state is adopted in the present invention as the shaft for turning the exchange arm 11. In other words, the exchange arm 11 has its phase changed by 90 degrees, but the rotary shaft 2 stands still. Thus, the drive belt 4 is switched by 90 degrees in the opposite direction with respect to the first rotary pulley 3 and the second rotary pulley 5 by the turn of the exchange arm 11 by 90 degrees, so that the tool holder 6 connected by the second rotary pulley 5 and the spline shaft 7 is also rotated by 90 degrees in the opposite direction. As a result, even if the exchange arm 11 is turned by 90 degrees, the tool holder 6 can convey the new tools T1 and T2 to the main spindle while holding its position at the side of the tool magazine as if it were not rotated in the least in its entirety. Since, moreover, the push of the push pin 26 by the dog 28 is instantly released by the turn of the exchange arm 11, the tool fingers 9c and 9d lock the new tools T1 and T2. If the exchange arm 11 is further turned to the vicinity of the main spindle, the push of the push pin 25 by the dog 27 is then started so that the tool fingers 9a and 9b are released from their locking states to clamp old tools T3 and T4.

Thus, if the tool holder 6 is turned by 90 degrees while holding its position, the tool fingers 9a and 9b are inserted into the grooves of the used old tools T3 and T4 clamped by main spindles S1 and S2, to complete the preparations for exchanging the old and new tools, as indicated at (c). When the main spindles S1 and S2 subsequently come into the unclamped states, the lift cylinder 8 operates to slide the spline shaft 7 downward to bring the tool holder 6 downward as it is, so that the old tools T3 and T4 clamped by the tool fingers 9a and 9b are extracted from the main spindles S1 and S2, as indicated at (d). At this time, the push of the push pin 25 by the dog 27 is released in accordance with the downward movement of the tool holder 6, but the tool fingers 9a and 9b come into their locking states so that they never fail to drop the old tools T3 and T4.

Next, when the first actuator 1 starts its drive, its rotation is transmitted through the rotary shaft 2, the first rotary pulley 3, the drive belt 4 and the second rotary pulley 5 to the spline shaft 7 so that the tool holder 6 is rotated in its lower position by 180 degrees, as indicated at (e). Incidentally, at this instant, the new tool T1 clamped by the tool finger 9c is just below the center of rotation of the main spindle S2, and the new tool T2 clamped by the tool finger 9d is just below the center of rotation of the main spindle S1.

Subsequently, the lift cylinder 8 operates to slide the spline shaft 7 upward so that the tool holder 6 is lifted in its position to insert the new tools T1 and T2 into the main spindles S2 and S1, respectively, as indicated at (f). At this time, immediately before the tool holder 6 is lifted to its substantially full stroke, the dog 27 starts to push the push pin 26. At the instant of the lift to the completely full stroke, the tool fingers 9c and 9d clamp the new tools T1 and T2 in their unlocked states.

When the insertion of the tools into the main spindles S1 and S2 are ended to bring the main spindles into their tool clamping states, the second actuator 12 is subsequently rotated in the opposite direction. This rotation is transmitted to the rotary shaft 23, the first rotary pulley 13, the drive belt 14, the second rotary pulley 15 and the hollow shaft 16 to turn and return the exchange arm 11 by 90 degrees to the tool magazine, as indicated at (g). At this time, too, the position of the tool holder 6 is held like the turn to the main shafts. Incidentally, the machining at the main spindles can suppress the influences of the chip or the like to the minimum because it is started when the exchange arm 11 is turned by 90 degrees to the tool magazine. Incidentally, the problem of the chip may desirably be solved by providing the machining center body with a filter, if possible.

When the exchange arm 11 is turned by 90 degrees to the tool magazine, the lift cylinder 8 then operates to slide the spline shaft 7 downward so that the tool holder 6 is moved downward, as indicated at (h). Incidentaly, at this time, the turn of the exchange arm by 90 degrees and the downward movement of the tool holder 6 can be synchronized so as to shorten the tool exchange time period.

When the downward movement of the tool holder 6 is completed, the slide cylinder 21 then starts its operation so that the slide shaft 24 retracts the slide base 18 placing and connecting the exchange arm 11 toward the tool magazine, until the old tool T3 clamped by the tool finger 9a stops just below a storage pot 30 whereas the old tool T4 clamped by the tool finger 9b stops just below a storage pot 29, as indicated at (i). At this time, the slide base 18 can be slide in a stable state by a narrow guide 19 disposed to clamp the former. When the lift cylinder 9 then operates, the spline shaft 7 is slid upward to lift the tool holder 6, as indicated at (j), till the old tools T3 and T4 are inserted into the storage pots 30 and 29, respectively. Since, moreover, the dog 28 pushes the push pin 25 in accordance with the rise of the tool holder 6, the tool fingers 9a and 9b clamp the old tools T3 and T4 in their unlocked states when the tool holder 6 rises to its full stroke.

When the insertions of the old tools into the storage pots are completed, the storage pots 29 and 30 come into their tool clamping states, and the slide cylinder 21 then operates to move again the exchange arm 11 placed on the slide base 18 forward to the main spindles 3, as indicated at (k).

Thus, when the exchanges of the old and new tools are completed, a tool magazine 22 selects a new tool, and the slide cylinder 21 operates again to move the exchange arm 11 placed and connected on the slide base 18 backward to the tool magazine so that the tool fingers 9a and 9b are inserted into the grooves of the new tools, as indicated at (l). When the storage pots 29 and 30 then come into their unclamping states, the lift cylinder 8 operates to move the tool holder 6 downward as it is and to extract new tools from the storage pots 29 and 30, as indicated at (m). Since, at this time, the push of the push pin 25 by the dog 28 is released according to the downward movement of the tool holder 6, the tool fingers 9a and 9b come into their locked states. Subsequently, when the slide cylinder 21 operates so that the exchange arm 11 moves forward to the main spindles, as indicated at (n), to a predetermined position, the lift cylinder 8 also operates to lift the tool holder 6, as indicated at (p). Incidentally, in order to shorten the tool exchange time period, the forward movement of the exchange arm 11 to the main spindles and the rise of the tool holder 6 could be simultaneously accomplished.

Thus, the exchange arm 11 is held in the standby state, in which the tool fingers 9a and 9b insert the new tools in the grooves and clamp then in the unlocked states, till the machining at the main spindles is ended so that the next tool exchange signal is issued.

The procedures thus far described belong to one cycle which is required for the old and new tool exchanges in case the present system is used.

INDUSTRIAL APPLICABILITY

As has been described hereinbefore, the exchange arm drive control system according to the present invention is made to have the remarkably simple structure and enabled to exchange the old and new tools by reciprocating the exchange arm only once between the main spindles and the tool magazine. Thus, it is possible to provide an automatic tool exchanger which is small-sized and has an excellent machinability.

Thus, the present invention is excellently compatible with with the vertical multi-spindle type machining center which is developed to aim at the machinability of several centers even with a floor space for one machine. If the system of the present invention is incorporated into the machining center, it is expectable to improve the machinability better.

Since the present invention has been imagined for the application in which the system is used mainly in the vertical quadruple spindle type machining center, two sets of the present system may be usually used with two or one common tool magazines. Despite of this imagination, however, one set of the present system can naturally be adopted in the vertical double spindle type machining center. In addition, three or four sets of the present system can also be used with a machining center having four or more spindles.

In dependence upon the arrangement of the present system and the tool magazines, the present invention could be applied to a horizontal multi-spindle type machining center.

We claim:
1. In a vertical quadruple spindle machining center, a drive control system for an exchange arm, said control system comprising:
   tool clamping and Z-axis tool holder moving means including a tool holder having four tool fingers for clamping individually two old and new tools and moving said tool holder upward and downward, and a lift cylinder having a spline shaft;
   180-degree tool holder rotating means including a first actuator, first and second rotating pulleys and a drive belt for rotating said tool holder by 180 degrees;
   90-degree exchange arm turning and tool holder positioning means including a second actuator, first and second rotating pulleys and a drive belt for turning said exchange arm by 90 degrees while holding the position of said tool holder; and
   the exchange arm supported at an end by a slide base linearly movable on a guide actuated by a slide cylinder having a slide shaft connected to the slide base, to enable forward and backward movement of the exchange arm along a Y-axis.

* * * * *

UNITED STATES PATENT AND TRADEMARK OFFICE
CERTIFICATE OF CORRECTION

PATENT NO. : 5,133,128
DATED : July 28, 1992
INVENTOR(S) : Toshio Katayama et al.

It is certified that error appears in the above-identified patent and that said Letters Patent is hereby corrected as shown below:

On the title page, item [22], change "Sep. 14, 1990" to --Mar. 8, 1990--.

Signed and Sealed this

Second Day of May, 1995

Attest:

BRUCE LEHMAN

*Attesting Officer*           *Commissioner of Patents and Trademarks*